United States Patent [19]

Niwa et al.

[11] Patent Number: 5,055,433
[45] Date of Patent: Oct. 8, 1991

[54] REFRACTORY HAVING HIGH RESISTANCE TO CORROSION AND SPALLING AND MANUFACTURING METHOD THEREOF

[75] Inventors: Shigeki Niwa; Kazuhide Kawai; Takahumi Nishibe; Toshio Kawamura, all of Aichi, Japan

[73] Assignee: Toshiba Ceramics Co., Ltd., Tokyo, Japan

[21] Appl. No.: 359,553

[22] Filed: Jun. 1, 1989

[30] Foreign Application Priority Data

Jun. 6, 1988 [JP] Japan ................................ 137432

[51] Int. Cl.$^5$ ..................... C04B 35/10; C04B 35/48
[52] U.S. Cl. ................................. 501/105; 501/107; 501/127; 423/608; 423/625
[58] Field of Search ................. 501/105, 97, 98, 107, 501/127, 153; 222/591; 423/608, 625

[56] References Cited

U.S. PATENT DOCUMENTS

| | | | |
|---|---|---|---|
| 4,585,485 | 4/1986 | Shikano et al. | 106/38.9 |
| 4,646,950 | 7/1987 | Gotoh et al. | 222/591 |
| 4,665,040 | 5/1987 | Kurita et al. | 501/105 |
| 4,829,028 | 5/1989 | Seki et al. | 501/105 |

*Primary Examiner*—William R. Dixon, Jr.
*Assistant Examiner*—Paul Marcantoni
*Attorney, Agent, or Firm*—Finnegan, Henderson, Farabow, Garrett and Dunner

[57] ABSTRACT

An alumina-zirconia electrofusing material whose chemical composition consists of about 30-75 wt. % $Al_2O_3$ and about 25-70 wt. % $ZrO_2$ is provided in an amount of about 5-50 wt %, and this electrofusing material is mixed with other materials, and a resultant mixture is press-shaped and fired to produce a slide gate refractory. In order to further improve resistance to corrosion and spalling, particle diameters of the electrofusing material are continuously distributed in a range from about 0.1 mm to about 2.5 mm.

8 Claims, No Drawings

REFRACTORY HAVING HIGH RESISTANCE TO CORROSION AND SPALLING AND MANUFACTURING METHOD THEREOF

BACKGROUND OF THE INVENTION

The present invention relates to an alumina-carbon based refractory, especially a slide gate refractory, having high resistance to corrosion and spalling.

Heretofore, there have been used to produce slide gate plates such refractory materials as an alumina based material, magnesia-spinel based material and alumina-carbon based material.

However, recently the application of these conventional refractory materials has become restricted because of the increased proportion of casting corrosive steel-type materials such as Ca-treated steel. In particular there is a growing need of high-resistant slide gate refractory materials.

Following various attempts have been made to improve the resistance of refractories to thermal shock.

One attempt is to include $SiO_2$ in a refractory material. This is effective to prevent the occurrence of small cracks.

It has been proposed that the thermal expansion of an alumina-carbon based refractory be reduced by addition of a low thermal expansion aggregate such as mullite or mullite-zirconia. This method is described in, for example, Japanese Patent Application Unexamined Publication No. 165549/1981. However, this method cannot provide sufficient resistance to corrosion because of the inclusion of $SiO_2$.

It has also been proposed that monoclinic zirconia be added to a refractory to develop microcracks by the crystal transformation. This method is described in, for example, Japanese Patent Application Unexamined Publication No. 20777/1983. However, this method has such a problem that microcracks occur in binding textures themselves in a refractory, thereby reducing binding strength.

Japanese Patent Application Examined Publication No. 2620/1986 proposes a process for producing an alumina-carbon based sliding nozzle plate which comprises providing 5-90 wt % of a refractory material whose chemistry consists of 80-98 wt % of $Al_2O_3$ and 2-20 wt % of $ZrO_2$, mixing said refractory material with other raw materials, shaping the mixture, and firing the shaped mixture. The alumina-carbon based refractories produced by this conventional method have suffered from the disadvantage that their flexural strength, corrosion resistance and anti-spalling property are sometimes insufficient depending on the conditions of their use.

If the alumina-carbon based refractory includes $SiO_2$, compounds of low melting temperature (i.e., $SiO_2$—CaO—FeO, $SiO_2$—FeO—MnO and $SiO_2$—FeO—$Al_2O_3$) are likely to be generated through the chemical reaction between $SiO_2$ and specific components in steel. In particular, $SiO_2$ in a slide gate refractory remarkably reacts with Ca in Ca-treated steel. This becomes a cause of reducing resistance of the refractory to corrosion. Since the corrosion quantity of the slide gate refractory is approximately proportional to the $SiO_2$ content in the refractory, increase of the $SiO_2$ content means increase of the corrosion. On the other hand, the reduction of $SiO_2$ content produces another problem of deterioration in the anti-spalling property. Appearance of the refractory has been desired which is sufficient both in the corrosion resistance and in the anti-spalling property.

SUMMARY OF THE INVENTION

An object, therefore, of the present invention is to make further refinement of the prior art, thereby providing a refractory that is improved, particularly in terms of resistance to corrosion and spalling.

Another object of the invention is to provide a refractory in which $SiO_2$ content is minimized.

In accordance with the present invention, an electrofusing material whose principal mineral phase is composed of corundum and monoclinic zirconia and whose chemistry consists of about 30-75 wt % $Al_2O_3$ and about 25-70 wt % $ZrO_2$ is provided in an amount of about 5-50 wt %, and this electrofusing material is mixed with other materials, and the mixture is shaped and fired.

In order to further improve the resistance to corrosion and spalling, particle diameters of the electrofusing material are continuously distributed in a range from about 0.1 mm to about 2.5 mm, a proportion of the alumina-zirconia electrofusing material in the refractory is restricted to about 5-20 wt %, and materials are provided so that chemical composition of a resultant refractory product consists of not less than about 80 wt % of $Al_2O_3$, not more than about 20 wt % of C, and not more than about 1 wt % of $SiO_2$.

Other and further objects, features and advantages of the invention will appear more fully from the following description.

DESCRIPTION OF THE PREFERRED EMBODIMENTS

An electrofusing material of the present invention has such a structure that monoclinic zirconia is dispersed in the corundum matrix, and the content of monoclinic zirconia will increase if the $Al_2O_3$ content is reduced and the $ZrO_2$ content is increased. A characteristic feature of the monoclinic zirconia is that it will expand or contract by the crystal transformation at a temperature of about 1,000° C., leading to the development of microcracks in or around crystal grains during the preparation of the electrofusing material or when a refractory using it as an aggregate is fired or used.

The present invention utilizes the development of such microcracks in achieving marked improvement in spalling resistance, which is one of the important characteristics of slide gate refractories. The corrosion resistance of the refractory can also be improved by increasing the content of $ZrO_2$.

When the content of $ZrO_2$ is increased in response to the decrease in the content of $Al_2O_3$, the strength of crystal grains will decrease accordingly, but this problem can be suppressed to a practically insignificant level if the material is prepared by electrofusion.

The eutectic point of an $Al_2O_3$-$ZrO_2$ system lies at 42.6 wt % $ZrO_2$ and compositions containing 30-50 wt % $ZrO_2$ will insure the highest level of mechanical strength. Therefore, the content of $ZrO_2$ is preferably adjusted to be within the range of 30-50 wt %.

If the proportion of the electrofusing material is less than 5 wt %, it becomes difficult to attain effective resistance to spalling and corrosion. If the proportion of the electrofusing material exceeds 50 wt %, excessive microcracking will occur in the inside of the product, leading to deterioration of its strength.

EXAMPLES

The following three electrofusing materials were prepared in an electric furnace: one having the chemistry consisting of 75 wt % $Al_2O_3$ and 25 wt % $ZrO_2$ (Example 1); another having the chemistry consisting of 60 wt % $Al_2O_3$ and 40 wt % $ZrO_2$ (Example 2); and the last having the chemistry consisting of 30 wt % $Al_2O_3$ and 70 wt % $ZrO_2$ (Example 3). For comparison, two additional samples of electrofusing material were prepared in the same electric furnace: one having the chemistry consisting of 80 wt % $Al_2O_3$ and 20 wt % $ZrO_2$ (Comparative Example 2); and the other having the chemistry consisting of 10 wt % $Al_2O_3$ and 90 wt % $ZrO_2$ (Comparative Example 3). In Comparative Example 1, the electrofusing material was replaced by monoclinic $ZrO_2$ that would provide the same content (10 wt %) of $ZrO_2$ in the refractory as in Example 2.

In each example, the electrofusing material was used in a proportion of 25 wt %, mixed with sintered alumina and carbon powder in the respective proportions indicated in Table 1, and kneaded in a mixer using a phenolic resin as a binder. The mixtures were pressed into plates and dried to evaporate the volatile components. Subsequently, the plates were fired in a reducing atmosphere in a coke oven.

The obtained refractories were measured for flexural strength (both at room temperature and at 1,400° C.), corrosion resistance, and anti-spalling property. The corrosion test was performed by a rotary immersion method, in which the sample was immersed in electrolytic iron at 1,600° C., whirled at 6 rpm and held for 1 hour. The degree of corrosion was evaluated in terms of an index, with the value for the sample tested in Comparative Example 2 being taken as 100. The test for evaluating the anti-spalling property was performed by repeating cycles of heating at 1,500° C. for 10 min. and subsequent water quenching. The test results were as shown in Table 1.

Slide gate plates were fabricated from the same formulations and subjected to a test under the practical use condition for estimating their service life. The results are also shown in Table 1, in which Examples 1 to 3 exhibit longer lives in comparison with Comparative Examples 1 to 3.

It should be noted that the present invention is applicable not only to a slide gate plate but also to well and collector nozzles and submerged nozzles.

fractory and can remarkably minimize the $SiO_2$ content in the refractory.

The second aspect is basically identical to the above-described first aspect and is further characterized by providing an alumina-zirconia electrofusing material having continuously distributed particle diameters ranging from about 0.1 mm to about 2.5 mm. An example of the distribution of the particle diameters is shown in Table 2.

TABLE 2

| Particle diameter (mm) | Proportion (wt %) |
| --- | --- |
| 2.5~3.0 | 4~6 |
| 2.0~2.5 | 6~8 |
| 1.5~2.0 | 6~8 |
| 1.0~1.5 | 16~20 |
| 0.5~1.0 | 27~31 |
| 0.1~0.5 | 24~28 |
| 0.05~0.1 | 4~6 |

The provision of such continuous distribution of the particle size realizes excellent corrosion resistance and anti-spalling property. It has been proved by the present inventors that this continuous distribution is very effective to the generation of microcracks without deterioration of atrength and can minimize the necessary content of $SiO_2$ or even eliminate it.

Furthermore, in the second aspect, the proportion of the alumina-zirconia electrofusing material in a refractory is restricted to 5-20 wt %. This further improve the resistance to thermal shock by reducing the thermal expansion coefficient of the refractory and facilitating the development of microcracks. The best resistance to thermal shock is attained with the proportion of the electrofusing material of about 8-10 wt %.

Also attained is an improvement of corrosion resistance by up to 25%.

A fine structure of a refractory can be realized by using a phenolic resin as a binder.

EXAMPLES

As shown in Table 3, there were prepared three types of alumina-zirconia electrofusing materials (Examples 4 to 6) with $ZrO_2$ proportions of 30 wt %. For comparison, also prepared were samples (Comparative Examples 7 and 8) both with $ZrO_2$ proportion of 30 wt %. On the other hand, in Comparative Examples 4 to 6, no alumina-zirconia electrofusing material was used. In Table 3, the chemical compositions of the refractory

TABLE 1

|  | Comp. Example 1 | Comp. Example 2 | Example 1 | Example 2 | Example 3 | Comp. Example 3 |
| --- | --- | --- | --- | --- | --- | --- |
| $ZrO_2$ content (wt %) in electrofusing material | — | 20 | 25 | 40 | 70 | 90 |
| Proportions of materials (wt %) |  |  |  |  |  |  |
| Electrofusing material | — | 25 | 25 | 25 | 25 | 25 |
| Monoclinic $ZrO_2$ | 10 | — | — | — | — | — |
| sintered alumina | 85 | 70 | 70 | 70 | 70 | 70 |
| carbon powder | 5 | 5 | 5 | 5 | 5 | 5 |
| phenolic resin* | 6 | 6 | 6 | 6 | 6 | 6 |
| Flexural strength (kg/cm$^2$) |  |  |  |  |  |  |
| R.T. | 265 | 280 | 330 | 380 | 360 | 198 |
| 1.400° C. | 195 | 215 | 233 | 268 | 242 | 121 |
| Corrosion index | 120 | 100 | 85 | 83 | 80 | 94 |
| Result of spalling test | good | good | excellent | excellent | excellent | fair |
| Service life (cycles) | 8 | 12 | 17 | 18 | 17 | 9 |

*The proportions of phenolic resin are indicated in terms of external proportions by weight.

A second aspect of the present invention will be hereinafter described, which further improves resistance to corrosion and spalling of an alumina-carbon based resamples are also listed, which consist of $Al_2O_3$, $SiO_2$, C and $ZrO_2$. It should be specifically pointed out that the sample in Comparative Example 7 contains a relatively large amount (1.5 wt %) of $SiO_2$, and the sample of Comparative Example 8 contains a relatively large amount (24.3 wt %) of C.

In each example, the electrofusing material was prepared in the proportion listed in Table 3, mixed with sintered alumina, carbon powder, mullite, mullite-zirconia and silica in the respective proportions listed in Table 3, and kneaded in a mixer using a phenolic resin as a binder. The mixtures were pressed into plates and dried to evaporate the volatile components. Subsequently, the plates were fired in a reducing atmosphere in a coke oven.

The obtained refractories were measured for flexural strength (both at room temperature and at 1,400° C.), corrosion resistance, and anti-spalling property. The corrosion test was performed by a rotary immersion method, in which the sample was immersed in electrolytic iron at 1,600° C., whirled at 6 rpm and held for 1 hour. The degree of corrosion was evaluated in terms of an index, with the value for the sample tested in Comparative Example 4 being taken as 100. The test for evaluating the anti-spalling property was performed by repeating cycles of heating at 1,500° C. for 10 min. and subsequent water quenching. The test results were as shown in Table 3.

Slide gate plates were fabricated from the same formulations and subjected to a test under the practical use condition for estimating their service life. The results are also shown in Table 3, in which Examples 4 to 6 exhibit longer lives in comparison with Comparative Examples 4 to 8.

It should be noted that the present invention is applicable not only to a slide gate plate but also to well and collector nozzles and submerged nozzles.

said refractory comprises about 5–20 wt % of particles of said alumina-zirconia electrofusing material; the particle diameters of said electrofusing material are continuously distributed in a range from about 0.1 mm to about 2.5 mm; and said refractory comprises not less than about 80 wt % of $Al_2O_3$, and not more than about 1 wt % of $SiO_2$.

3. A refractory as claimed in claim 1, wherein said refractory is a slide gate refractory.

4. A manufacturing method of an alumina-carbon based refractory, comprising the steps of:

providing 50–95 wt % of a first material consisting essentially of a sintered alumina/carbon powder mixture and about 5–50 wt % of an alumina/zirconia electrofusing material which consists essentially of about 30–75 wt % of $Al_2O_3$ and about 25–70 wt % of $ZrO_2$ and has a structure of monoclinic zirconia dispersed in a corundum matrix;

mixing said electrofusing material with said first material by kneading, the resultant mixture comprising carbon in an amount of not more than about 20 wt %;

shaping the resultant mixture by press forming;

firing the shaped mixture; and microcracks are developed in and around crystal grains in said mixture by causing expansion or contraction of said monoclinic zirconia.

5. A manufacturing method as claimed in claim 4, wherein in said providing step, about 5–20 wt % of said electrofusing material is in the form of particles having particle diameters continuously distributed in a range from about 0.1 mm to about 2.5 mm; and in said mixing step, said materials are mixed so that the chemical composition of the refractory comprises not less than about 80 wt % of $Al_2O_3$, and not more than 1% of $SiO_2$.

TABLE 3

|  | Comp. Example 4 | Comp. Example 5 | Comp. Example 6 | Example 4 | Example 5 | Comp. Example 7 | Example 6 | Comp. Example 8 |
|---|---|---|---|---|---|---|---|---|
| Proportions of materials (wt %) | | | | | | | | |
| electrofusing material | — | — | — | 10 | 7 | 10 | 10 | 10 |
| sintered alumina | 78 | 78 | 85 | 78 | 78 | 73 | 73 | 68 |
| carbon powder | 12 | 12 | 12 | 12 | 12 | 12 | 17 | 22 |
| mullite | 10 | — | — | — | 3 | 5 | — | — |
| mullite-Zirconia | — | 10 | — | — | — | — | — | — |
| silica | — | — | 3 | — | — | — | — | — |
| phenolic resin* | 6 | 6 | 6 | 6 | 6 | 6 | 6 | 6 |
| Chemical composition (wt %) | | | | | | | | |
| $Al_2O_3$ | 82.0 | 81.6 | 82.0 | 81.9 | 82.0 | 80.5 | 77.1 | 72.2 |
| $SiO_2$ | 2.9 | 3.3 | 2.9 | 0.1 | 0.9 | 1.5 | 0.1 | 0.1 |
| C | 14.6 | 14.6 | 14.6 | 14.6 | 14.6 | 14.6 | 19.4 | 24.3 |
| $ZrO_2$ | — | — | — | 2.9 | 2.0 | 2.9 | 2.9 | 2.9 |
| Flexural strength (kg/cm²) | | | | | | | | |
| R.T. | 280 | 283 | 275 | 290 | 288 | 280 | 265 | 207 |
| 1,400° C. | 215 | 217 | 208 | 220 | 215 | 214 | 190 | 143 |
| Corrosion index | 100 | 96 | — | 75 | 78 | 97 | 85 | 110 |
| Result of spalling test | good | good | good | good | good | good–excellent | good–excellent | excellent |
| Service life (cycles) | 9 | 11 | 10 | 18 | 17 | 11 | 17 | 9 |

*The proportions of phenolic resin are indicated in terms of external proportions by weight.

What is claimed is:

1. An alumina-carbon based refractory comprising between 50–95 wt % of a material consisting essentially of a sintered alumina/carbon powder mixture wherein:

said refractory also comprises about 5–50 wt % of an alumina-zirconia electrofusing material and carbon in an amount of not more than about 20 wt %; and said electrofusing material consists essentially of about 30–75 wt % of $Al_2O_3$ and about 25–70 wt % of $ZrO_2$.

2. A refractory as claimed in claim 1, wherein:

6. A manufacturing method as claimed in claim 4, wherein in said shaping process, said mixture is shaped into a slide gate refractory.

7. The manufacturing method of claim 4 wherein said microcracks in and around crystal grains are developed during the preparation of the electrofusing material.

8. The manufacturing method of claim 4 wherein said microcracks in and around crystal grains are developed when the refractory containing the electrofusing material is fired.

* * * * *